(12) United States Patent
Kneib et al.

(10) Patent No.: US 11,012,453 B2
(45) Date of Patent: May 18, 2021

(54) METHOD FOR PROTECTING A VEHICLE NETWORK AGAINST MANIPULATED DATA TRANSMISSION

(71) Applicant: Robert Bosch GmbH, Stuttgart (DE)

(72) Inventors: Marcel Kneib, Mainhardt (DE); Michael Weber, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 15/991,176

(22) Filed: May 29, 2018

(65) Prior Publication Data

US 2018/0359271 A1 Dec. 13, 2018

(30) Foreign Application Priority Data

Jun. 7, 2017 (DE) .......................... 102017209556.3

(51) Int. Cl.
| | |
|---|---|
| *H04L 29/06* | (2006.01) |
| *H04L 12/46* | (2006.01) |
| *H04W 12/12* | (2021.01) |
| *H04L 9/08* | (2006.01) |
| *H04L 12/44* | (2006.01) |

(Continued)

(52) U.S. Cl.
CPC ........ *H04L 63/1425* (2013.01); *H04L 9/0877* (2013.01); *H04L 12/4625* (2013.01); *H04W 12/12* (2013.01); *H04L 12/40* (2013.01); *H04L 63/1483* (2013.01); *H04L 67/12* (2013.01); *H04L 2012/40215* (2013.01); *H04L 2012/40273* (2013.01); *H04L 2012/445* (2013.01); *H04L 2209/84* (2013.01)

(58) Field of Classification Search
CPC ............. H04L 63/1425; H04L 63/1483; H04L 9/0877; H04L 12/4625; H04L 12/12; H04L 12/40; H04L 67/12; H04L 2012/40215; H04L 2012/40273; H04L 2012/445; H04L 2209/84

See application file for complete search history.

(56) References Cited

U.S. PATENT DOCUMENTS

| | | | | |
|---|---|---|---|---|
| 10,142,358 B1 * | 11/2018 | Bajpai | ................... | H04L 43/028 |
| 2005/0278147 A1 * | 12/2005 | Morton | ............... | G06F 11/2273 |
| | | | | 702/183 |

(Continued)

FOREIGN PATENT DOCUMENTS

| | | |
|---|---|---|
| DE | 102009026995 A1 | 3/2011 |
| DE | 102015219996 A1 | 4/2017 |

*Primary Examiner* — Kristine L Kincaid
*Assistant Examiner* — Alexander R Lapian
(74) *Attorney, Agent, or Firm* — Norton Rose Fulbright US LLP; Gerard Messina

(57) ABSTRACT

A method is provided for protecting a vehicle network of a vehicle against manipulated data transmission, in which the vehicle network includes multiple network nodes, and at least one first network node in the vehicle network in a normal mode checking a first received message as to whether the first received message is a message assigned to the first network node in the normal mode, but which the first network node did not transmit. The first network node in a diagnostic mode further checks a second received message as to whether the second received message is a message assigned to the first network node in the normal mode or in the diagnostic mode, but which the first network node did not transmit.

18 Claims, 1 Drawing Sheet

(51) Int. Cl.
  *H04L 12/40* (2006.01)
  *H04L 29/08* (2006.01)

(56) References Cited

U.S. PATENT DOCUMENTS

| | | | |
|---|---|---|---|
| 2015/0033054 A1* | 1/2015 | Armbruster | G06F 11/2038 |
| | | | 713/323 |
| 2016/0110929 A1* | 4/2016 | Park | H04W 76/10 |
| 2016/0269225 A1* | 9/2016 | Kirchmeier | H04L 12/413 |
| 2016/0294855 A1* | 10/2016 | Maeda | H04L 12/28 |
| 2017/0026386 A1* | 1/2017 | Unagami | G06F 21/71 |
| 2017/0063996 A1* | 3/2017 | Kaster | H04L 63/1425 |
| 2017/0118038 A1* | 4/2017 | Ujiie | H04L 12/66 |
| 2017/0180370 A1* | 6/2017 | Satoh | G06F 21/566 |
| 2017/0310674 A1* | 10/2017 | Markham | B60R 16/0231 |
| 2018/0124030 A1* | 5/2018 | Bima | H04L 12/40006 |
| 2018/0227306 A1* | 8/2018 | Borkowicz | H04L 63/101 |
| 2019/0238579 A1* | 8/2019 | Stahlin | H04L 63/1425 |
| 2019/0261176 A1* | 8/2019 | Yamazaki | H04W 4/44 |

* cited by examiner

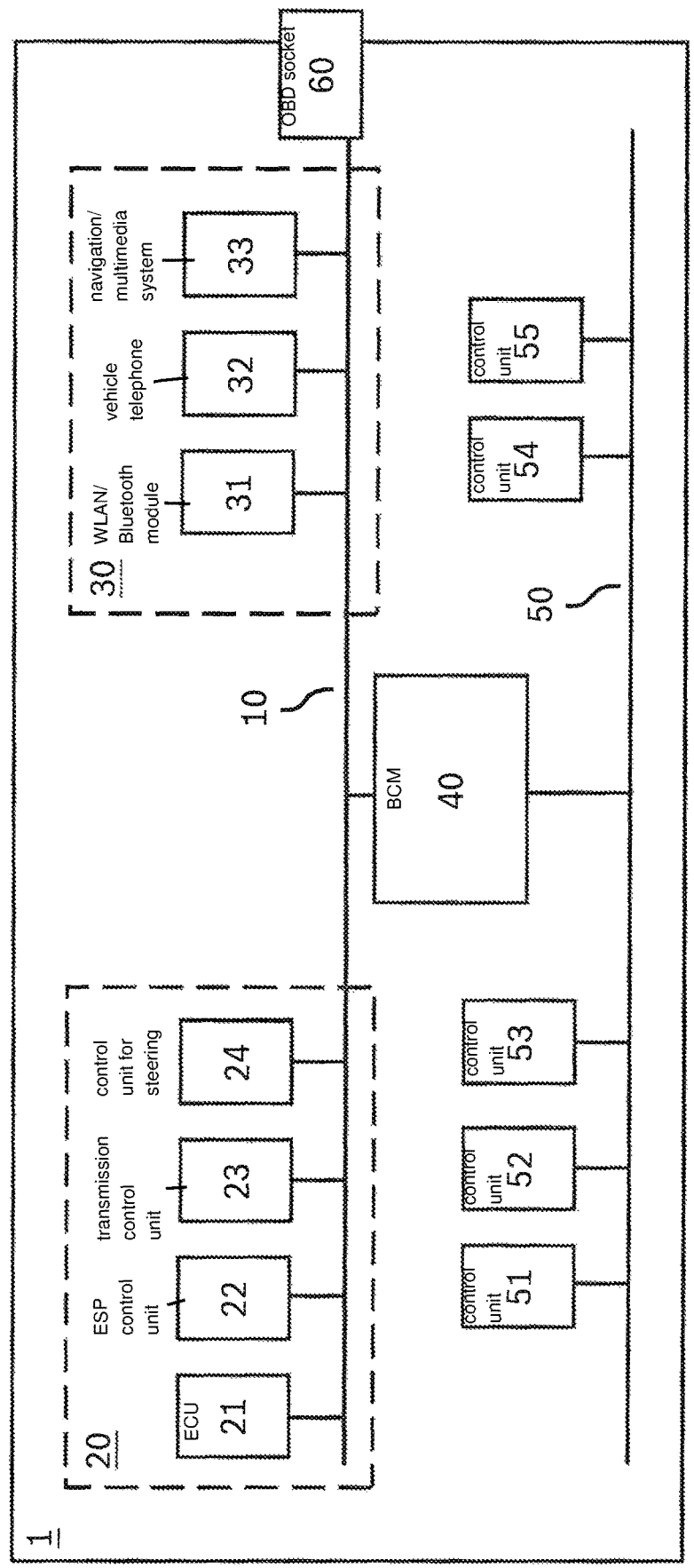

METHOD FOR PROTECTING A VEHICLE NETWORK AGAINST MANIPULATED DATA TRANSMISSION

CROSS REFERENCE

The present application claims the benefit under 35 U.S.C. § 119 of German Patent Application No. DE 102017209556.3 filed on Jun. 7, 2017, which is expressly incorporated herein by reference in its entirety.

FIELD

Methods are provided for protecting a vehicle network against manipulated data transmission, as well as a computer program configured for this purpose.

BACKGROUND INFORMATION

A method for averting a manipulation on a CAN bus by a node connected to the bus with the aid of a CAN controller is described in German Patent Application No. DE 10 2015 219 996 A1. In this method, a secured transmission module of the first node monitors the bus and detects transmission processes of the CAN controller in a normal operation of the first node. The transmission module also detects a message inadmissibly transmitted on the bus in a manner that deviates from the normal operation and, if the transmission module detects the message, initiates countermeasures provided against the manipulation.

German Patent Application No. DE 10 2009 026 995 A1 describes a method for operating a bus system, in particular, a CAN bus, to which multiple stations are connectable. A transmitted message includes an identifier, whereby a particular identifier may always only be used by a single station. Each of the stations compares the identifier of a transmitted message with the identifiers used by the station itself. An error message is generated in the event of coincidence.

SUMMARY

Example methods are provided, with which a network of a vehicle and, therefore, the vehicle may be protected against manipulated data transmission or may be reinforced against such an attack. In such case, the vehicle network includes multiple network nodes, at least one first network node in the vehicle network in the normal mode checking a first received message as to whether the first received message is a message assigned to the first network node in the normal mode, but was not transmitted by the first network node. It is now provided that the first network node in a diagnostic mode checks a second received message as to whether the second received message is a message assigned to the first network node in the normal mode or in the diagnostic mode, but was not transmitted by the first network node. The detection may take place, in particular, based on identification information of the messages.

Thus, a particularly effective safeguarding of a vehicle network is possible against instantaneous, refined attacks on vehicle networks, which exploit the diagnostic mode of network nodes, in particular, of vehicle control units. This approach is implementable without additional hardware and may therefore be simply implemented in software or transferred in a retrofit package as a software update to existing systems, such as previously delivered vehicles.

An additional advantage of this approach is that it may be implemented regardless of the vehicle variant (coupe, limousine, cabrio, various transmissions, various engines, etc.), since each network node, in particular, each control unit, monitors itself. Therefore, no special adaptation to the other network nodes must take place.

A vehicle network, and therefore, the vehicle may become even more secure against attacks, in which the attacker exploits diagnostic functions of the vehicle network, if network nodes may only be shifted into a diagnostic mode or may only be completely turned off when the vehicle is in a secure state. On the one hand, the most critical impacts of such an attack, namely impacts on critical driving functions in the driving mode, may then be prevented or at least impeded. On the other hand, the possibilities for an attacker to attack a vehicle via an attack, in particular, from afar, while exploiting diagnostic modes of control units, are reduced.

Moreover, it is advantageous for diagnostic messages if a corresponding monitoring takes place by relaying network nodes, such as bridge control units or gateway control units, in order to render the vehicle network even more robust against attacks in diagnostic scenarios.

If a network node detects a manipulation of the data transmission based on a received message, which actually only the network node itself is supposed to transmit, but did not do so, it then preferably initiates countermeasures. The following measures have proven advantageous, if necessary, also in combination:

deactivating the vehicle network or a part of the vehicle network,
invalidating the first message,
sending out an error message, in particular, as an additional diagnostic message or as manipulated information in an additional message assigned to the first network node, in particular, in a test section of the additional message,
refraining from transmitting specific, in particular, security-critical messages,
ignoring messages received by at least the first network node of the multiple network nodes in the vehicle network,
shifting the vehicle into an emergency mode having limited functionality,
resetting information in the vehicle network after switching the ignition off and on.

BRIEF DESCRIPTION OF THE DRAWING

The present invention is described in greater detail below with reference to the FIGURE and based on exemplary embodiments.

FIG. 1 schematically shows an exemplary vehicle network including multiple network participants or network nodes.

DETAILED DESCRIPTION OF EXAMPLE EMBODIMENTS

The present invention relates to a method for protecting a vehicle network against manipulated data transmission.

Vehicle networks are usually made up of different network nodes, most commonly, control unit nodes, which are interconnected to one another via bus systems, presently primarily CAN, LIN FlexRay and MOST. One component per bus system is installed in the control unit hardware, which takes over the communication both in the transmitting as well as in the receiving direction. The control unit nodes also have a processing unit that executes a computer program. This program is frequently configured in such a way that a specific number of messages may be transmitted and a specific number of messages may be received by one control unit node. These sets of messages are regularly disjunct if the control unit is not a bridge or a gateway of the bus system.

FIG. 1 schematically shows an exemplary vehicle network 1. This network includes a main bus 10, with which a group of security-critical network nodes 20, as well as a group of network nodes having a radio link 30 are connected. The group of security-critical network nodes 20 includes, for example, an engine control unit 21, an ESP control unit 22, a transmission control unit 23 and a control unit for the steering 24. The group of network nodes having radio link 30 includes, for example, a WLAN and/or Bluetooth module 31, an integrated vehicle telephone 32 and a combination navigation and multimedia system 33. An OBD socket 60 is also connected to the main bus and is configured as a vehicle-external network or a vehicle-externally directed interface.

A so-called body control unit 40 (body controller, BCM) is connected to both main bus 10 as well as to an additional bus 50. Additional network nodes, in particular, control units 51 through 55 are also connected to additional bus 50.

Conventional attacks on vehicle networks in many cases manipulate standard messages or diagnostic messages in such a vehicle network 1. In such case, messages are transmitted from control units, which are not actually provided for such purpose. They are often transmitted at a, in part, significantly higher data rate in order to get through or to prevail on the bus system as opposed to the regular messages.

The bus types prevalent in the vehicle often function so that all messages transmitted are received by all network nodes. It is generally not apparent to the receiving network node which (other) network node has transmitted a particular received message. In general, there is also no 1:1 communication. This makes it extremely difficult to detect whether a received message comes from the correct sender.

Attacks on vehicle networks, which are aimed at manipulating a data transmission in the vehicle network, are often carried out remotely, i.e. via radio interfaces. Such an attack may, for example, be subdivided into three steps:
1. Malicious take-over of a remote-enabled control unit from afar.
2. Manipulation of the control unit so that the control unit transmits specific messages to a security-critical control unit.
3. Thereby inducing the security-critical control unit to carry out undesired, in particular, unsecured operations.

In the event of a manipulation of standard messages in the normal mode of the control unit nodes, protection against such an attack or against a data transmission manipulated in this way may take place by each control unit node monitoring the bus for messages, which are normally transmitted by the control unit node itself or may be allowed to be transmitted only by the control unit node itself. If a message is detected by a control unit node, which the control unit node itself did not transmit, then an attack or a corresponding manipulation of the data transmission may exist, and a suitable counter-response is initiated.

However, this method alone is not sufficient against newer and more refined attacks on vehicle networks, in which individual control unit nodes are sent specifically into the diagnostic mode. In this mode, control units generally transmit no messages or only few messages. The standard messages may, however, be switched off in this way.

It becomes particularly critical when a control unit node is shifted into the diagnostic mode, but other control unit nodes remain in a normal mode or in a second mode differing from the diagnostic mode. In this case, false messages may be transmitted by an acquired control unit node without the control unit node actually assigned to these messages detecting it, since it is in the diagnostic mode. This is therefore the case, since the diagnostic mode corresponds to a software instance on the control unit node that differs from a normal mode, which includes other messages to be transmitted themselves and generally expects only diagnostic messages of other control unit nodes. If the standard method were to be similarly applied here, the control unit node would merely check for received messages that are assigned to it in the diagnostic mode. Thus, it is provided that in the diagnostic mode as well, the control unit node checks received messages as to whether these are messages assigned to it in the normal mode. This functionality of the control unit node must also be implemented for such purpose in the software instance (redundant) corresponding to the diagnostic mode, including the information about the messages in the normal mode.

As an additional safeguard, the control unit nodes may be configured in such a way that they may be shifted only into the diagnostic mode and/or may only be switched off when the vehicle is in a secure state, in particular, when the vehicle is stationary. The vehicle velocity is provided in the network, for example, by the ESP (electronic stability program). To prevent the vehicle velocity from being manipulated, the described monitoring by the control unit nodes are again resorted to. This is intended, in particular, to prevent control unit nodes from being able to be completely switched off in critical vehicle states, in particular, in the driving mode. Not only would the malfunction per se be critical. This would also make it possible to circumvent the described method, since messages that are assigned to the switched-off control unit nodes could also be sent without the switched-off control unit nodes being able to detect them.

Onboard diagnostic messages (OBD) are often dispatched in the vehicle network via a bus different from that of the standard messages in the normal operation. This is often a CAN bus, which is connected to an OBD socket. If the control unit network implemented by the vehicle network is divided into sub-networks, then bridge control units (bridges) and/or gateway control units (gateways) are generally present in such case, which relay requests and responses via the OBD socket from and to the repair shop testers accessing the vehicle. In this case, a monitoring of the messages may be implemented as described above by the relaying bridge control unit or the gateway control unit themselves checking diagnostic messages.

Various responses to or countermeasures against a detected manipulation of the data transmission may be provided in the vehicle network. The main goal should be to ensure a reliable operation of the vehicle. If this is not possible, the operation of the vehicle should then be prevented.

An initial hurdle is how the network node detecting the data manipulation may also include the other network nodes in the countermeasure or how it may communicate to the other network nodes that an attack has been detected.

Various options include:
deactivating the network or a part of the network,
invalidating the message,
"concealing" the information in a legitimate message (for example, a false CRC code), an additional diagnostic message, which is transmitted on-demand, no longer transmitting a legitimate message.

The last-mentioned measure would also function, for example, if the network or the bus is flooded with several messages by the attacker. In this case, the message would necessarily remain unsent.

A second point is how the other control units are to respond thereto. Here, it is desirable to give the attacker as few clues as possible, which the attacker could use for a refinement or expansion of the attack. This may happen in that all control units no longer trust, in particular, simply ignore, the network or a part of the network. As a result, the attacker is no longer able to continue searching for weak spots.

In addition, errors could also be set in the error memory that may only be reset in the repair shop. Shifting the vehicle into an emergency driving mode is another option, as is a resetting of information in the network after a switching off and on of the ignition.

The approaches provided require neither additional hardware nor an intervention in existing hardware. Thus, it is easily possible to retrofit vehicles or vehicle networks via a software update with such an attack detection or with such protection against a manipulation of the data transmission.

What is claimed is:

1. A method for protecting a vehicle network of a vehicle against manipulated data transmission, the vehicle network including multiple network nodes, the method comprising:
    checking, by at least one first network node in the vehicle network in a normal mode, a first received message as to whether the first received message is a message which only the first network node in the normal mode is permitted to transmit, but which the first network node did not transmit; and
    checking, by the first network node in a diagnostic mode, a second received message as to whether the second received message is a message which only the first network node in the normal mode or in the diagnostic mode is permitted to transmit, but which the first network node did not transmit;
    wherein the first network node may be switched off only when the vehicle is stationary;
    wherein the first network node in the diagnostic mode detects the manipulated data transmission when the second received message is a message only the first network node in the normal mode or in the diagnostic mode is permitted to transmit, but which the first network node did not transmit;
    wherein the first network node initiates a countermeasure for protecting the vehicle network when it detects the manipulated data transmission;
    wherein the diagnostic mode and the normal mode correspond to different software instances, on the first network node, relative to one another; and
    wherein the first network node may be shifted into the diagnostic mode only when the vehicle is in a secure state, the secure state being a state in which the vehicle is stationary.

2. The method as recited in claim 1, further comprising:
    detecting by at least the first network node of the multiple network nodes via a message including vehicle data received in the vehicle network whether the vehicle is in the secure state.

3. The method as recited in claim 2, wherein the received message including the vehicle data contains a vehicle velocity.

4. The method as recited in claim 1, wherein the first network node is a bridge control unit or a gateway control unit and the first received message is a relayed diagnostic message.

5. The method as recited in claim 1, wherein the countermeasure further includes at least one of:
    deactivating the vehicle network or a part of the vehicle network,
    sending out an error message as an additional diagnostic message or as manipulated information in an additional message assigned to the first network node in a test section of the additional message,
    refraining from transmitting specific security-critical messages,
    ignoring messages received in the vehicle network by at least the first network node of the multiple network nodes,
    shifting the vehicle into an emergency mode having limited functionality.

6. The method as recited in claim 1, wherein the countermeasure includes deactivating the vehicle network or part of the vehicle network.

7. The method as recited in claim 1, wherein the countermeasure includes sending out an error message as an additional diagnostic message or as manipulated information in an additional message assigned to the first network node in a test section of the additional message.

8. The method as recited in claim 1, wherein the countermeasure includes refraining from transmitting specific safety-critical messages.

9. The method as recited in claim 1, wherein the countermeasure includes shifting the vehicle into an emergency mode having limited functionality.

10. The method as recited in claim 1, wherein the countermeasure includes ignoring at least part of the vehicle network.

11. The method as recited in claim 1, wherein the countermeasure includes: (i) switching an ignition of the vehicle off and then on, and (ii) after the switching, resetting information in the vehicle network.

12. A non-transitory machine-readable memory medium, on which is stored a computer program for protecting a vehicle network of a vehicle against manipulated data transmission, the vehicle network including multiple network nodes, the computer program,
    when executed by a processing unit, causing the processing unit to perform:
        checking, by at least one first network node in the vehicle network in a normal mode, a first received message as to whether the first received message is a message which only the first network node in the normal mode is permitted to transmit, but which the first network node did not transmit; and
        checking, by the first network node in a diagnostic mode, a second received message as to whether the second received message is a message which only the first network node in the normal mode or in the diagnostic mode is permitted to transmit, but which the first network node did not transmit;
        wherein the first network node may be switched off only when the vehicle is stationary;
        wherein the first network node in the diagnostic mode detects the manipulated data transmission when the second received message is a message only the first network node in the normal mode or in the diagnostic mode is permitted to transmit, but which the first network node did not transmit;

wherein the first network node initiates a countermeasure for protecting the vehicle network when it detects the manipulated data transmission; and wherein the diagnostic mode and the normal mode correspond to different software instances, on the first network node, relative to one another; and wherein the first network node of the multiple network nodes may be shifted into the diagnostic mode only when the vehicle is in a secure state, the secure state being a state in which the vehicle is stationary.

13. The non-transitory machine-readable memory medium as recited in claim 12, wherein the countermeasure includes: (i) switching an ignition of the vehicle off and then on, and (ii) after the switching, resetting information in the vehicle network.

14. A control unit in a vehicle, comprising:
a processing unit; and
a non-transitory machine-readable memory medium, on which is stored a computer program for protecting a vehicle network of a vehicle against manipulated data transmission, the vehicle network including multiple network nodes, the computer program, when executed by the processing unit, causing the processing unit to perform:
checking, by a first network node in the vehicle network in a normal mode, a first received message as to whether the first received message is a message which only the first network node in the normal mode is permitted to transmit, but which the first network node did not transmit, wherein the control unit is the first network node; and
checking, by the first network node in a diagnostic mode, a second received message as to whether the second received message is a message which only the first network node in the normal mode or in the diagnostic mode is permitted to transmit, but which the first network node did not transmit;
wherein the first network node may be switched off only when the vehicle is stationary;
wherein the first network node in the diagnostic mode detects the manipulated data transmission when the second received message is a message only the first network node in the normal mode or in the diagnostic mode is permitted to transmit, but which the first network node did not transmit;
wherein the first network node initiates a countermeasure for protecting the vehicle network when it detects the manipulated data transmission;
wherein the diagnostic mode and the normal mode correspond to different software instances, on the first network node, relative to one another; and
wherein the first network node may be shifted into the diagnostic mode only when the vehicle is in a secure state, the secure state being a state in which the vehicle is stationary.

15. The control unit as recited in claim 14, wherein the countermeasure includes at least one of:
deactivating the vehicle network or a part of the vehicle network,
sending out an error message as an additional diagnostic message or as manipulated information in an additional message assigned to the first network node in a test section of the additional message,
refraining from transmitting specific security-critical messages,
ignoring messages received in the vehicle network by at least the first network node of the multiple network nodes,
shifting the vehicle into an emergency mode having limited functionality.

16. The control unit as recited in claim 14, wherein the countermeasure includes: (i) switching an ignition of the vehicle off and then on, and (ii) after the switching, resetting information in the vehicle network.

17. A method for protecting a vehicle network of a previously delivered vehicle against manipulated data transmission, the method comprising:
uploading a computer program via a software update on at least one control unit of the vehicle network, the computer program for protecting the vehicle network of the vehicle against manipulated data transmission, the vehicle network including multiple network nodes, the computer program, when executed by a processing unit of the control unit, causing the processing unit to perform:
checking, by at least one first network node in the vehicle network in a normal mode, a first received message as to whether the first received message is a message which only the first network node in the normal mode is permitted to transmit, but which the first network node did not transmit; and
checking, by the first network node in a diagnostic mode, a second received message as to whether the second received message is a message which only the first network node in the normal mode or in the diagnostic mode is permitted to transmit, but which the first network node did not transmit;
wherein the first network node may be switched off only when the vehicle is stationary;
wherein the first network node in the diagnostic mode detects the manipulated data transmission when the second received message is a message only the first network node in the normal mode or in the diagnostic mode is permitted to transmit, but which the first network node did not transmit;
wherein the first network node initiates a countermeasure for protecting the vehicle network when it detects the manipulated data transmission;
wherein the countermeasure includes: (i) switching an ignition of the vehicle off and then on, and (ii) after the switching, resetting information in the vehicle network.

18. The method as recited in claim 17, wherein:
the diagnostic mode and the normal mode correspond to different software instances on the first network node relative to one another; and
wherein the first network node of the multiple network nodes may be shifted into the diagnostic mode only when the vehicle is in a secure state, the secure state being a state in which the vehicle is stationary.

* * * * *